United States Patent [19]

Rütschle

[11] Patent Number: 5,435,675
[45] Date of Patent: Jul. 25, 1995

[54] MACHINE TOOL

[75] Inventor: Eugen Rütschle, Mülheim/Donau, Germany

[73] Assignee: Chiron-Werke GmbH & Co. KG, Germany

[21] Appl. No.: 291,166

[22] Filed: Aug. 16, 1994

[30] Foreign Application Priority Data

Sep. 14, 1993 [DE] Germany ............... 43 31 090.7

[51] Int. Cl.⁶ ............................................. B23Q 11/08
[52] U.S. Cl. ................. 409/134; 29/DIG. 56; 408/710; 451/455
[58] Field of Search ................. 409/134, 136; 408/241.6, 710; 74/608; 29/DIG. 56, DIG. 59, DIG. 60, 33 P; 451/451, 455, 457

[56] References Cited

U.S. PATENT DOCUMENTS

| | | |
|---|---|---|
| 4,373,406 | 2/1983 | Piotrowski ............ 408/710 X |
| 4,863,319 | 9/1989 | Winkler et al. . |
| 4,966,505 | 10/1990 | Winkler et al. . |
| 4,999,895 | 3/1991 | Hirose et al. . |
| 5,342,156 | 8/1994 | Baba .................... 409/134 |

FOREIGN PATENT DOCUMENTS

| | | |
|---|---|---|
| 248536 | 3/1990 | Germany . |
| 1071396 | 2/1984 | U.S.S.R. ............... 409/134 |

*Primary Examiner*—William Briggs
*Attorney, Agent, or Firm*—Pretty, Schroeder, Brueggemann & Clark

[57] ABSTRACT

A machine tool (10) comprises a spindle head (11) and a workpiece table (12), in which a first region is provided as a machining side (14) for first workpieces (17) for machining by means of a tool, and in which a second region as a loading side (15) can be loaded with second workpieces (17'), preferably while the first workpieces (17) are being machined. The two regions (14, 15) can be exchanged by means of relative positional change between the spindle head (11) and the workpiece table (12) occurring in the direction of a first coordinate (18) of the workpiece table (12). A spray shielding panel (16), extending in the direction of a second coordinate (19) approximately perpendicular to the first coordinate (18), is provided between the regions (14, 15). The spray shielding panel (16) is configured at least in sections with a variable length in the direction of the second coordinate (19).

10 Claims, 5 Drawing Sheets

MACHINE TOOL

FIELD OF THE INVENTION

The invention relates to a machine tool having a spindle head and a workpiece table, in which a first region is provided as a machining side for first workpieces for machining by means of a tool, and in which a second region can be loaded with second workpieces as a loading side, preferably while the first workpieces are being machined, such that the two regions can be exchanged by means of relative positional change between the spindle head and the workpiece table occurring in the direction of a first coordinate of the workpiece table, and wherein further a spray shielding panel, extending in the direction of a second coordinate approximately perpendicular to the first coordinate, is provided between the regions.

The invention further concerns a spray shielding panel for a machine tool of this kind.

PRIOR ART

Machine tools and spray shielding panels of this kind are generally known from the prior art.

A machine tool of this kind is described in U.S. Pat. No. 4,966,505, according to which spindle head and workpiece table can be displaced relative to one another in the lengthwise direction of the workpiece table. During each such relative displacement the spray shielding panel is folded over so that the workpiece table is divided asymmetrically into a larger machining side and a correspondingly smaller loading side. In this manner, during machining of a workpiece on the machining side a new workpiece can be clamped on the loading side, with the spray shielding panel shielding operators from sprayed cutting fluid or flying chips, etc.

During relative displacement, however, which can be performed either by the spindle head or by the workpiece table, the spindle must be moved all the way back in the direction of the second coordinate so that its region projecting over the workpiece table does not collide with the spray shielding panel.

It is a disadvantage of this machine tool that the spindle head must be moved entirely out of the region of the workpiece table prior to relative displacement. Not only is this associated with a great expenditure of time which has a disadvantageous influence on workpiece changing time, but also appropriate room must be provided "behind" the machine tool in order to accommodate the spindle head as it moves backward. Because of the long guideways of the spindle head, the outlay for physical materials is also high, which can lead to high costs.

A similar machine tool is known from U.S. Pat. No. 4,863,319, although in this the workpiece table is rotatable about a vertical axis. Here again, for the purpose of collision avoidance the spindle head is moved out of the movement space of the spray shielding panel before the workpiece table is turned. In this case the spray shielding panel, also foldable, does not extend over the entire width of the workpiece table, so that the disadvantages discussed above are reduced. On the other hand, however, there is the further disadvantage that a complete separation between machining side and loading side is not possible, so that operators can be obstructed and possibly injured by residues of cutting fluid and chips that might reach the loading side.

Other machine tools, also known, in which the spray shielding panel may be configured as stationary, provide for cutouts in the spray shielding wall that correspond to the silhouette of the spindle head which still projects over the workpiece table during displacement. Since in this case it is no longer necessary to move the spindle head entirely out of the region of the workpiece table, workpiece changing time can be reduced as compared with the machine tools discussed above, but because of the cutouts the danger of obstruction by cutting fluid and/or chips spraying across is much greater.

Proceeding from this prior art, it is the object of the present invention to create a machine tool that, while having a short workpiece changing time and a simple, space-saving design, still provides for good sealing between the machining side and loading side of the workpiece table.

SUMMARY OF THE INVENTION

In the aforesaid machine tool and the aforementioned spray shielding panel, this object is achieved, according to the invention, by the fact that the spray shielding panel is configured at least in sections with a variable length in the direction of the second coordinate.

The object underlying the invention is completely achieved in this manner. Specifically, because the spray shielding panel is now moved out of the region of the spindle head which moves relative to it, and not vice versa, a very much faster change between loading side and machining side can occur with this movement because of the very much smaller mass being moved (a part of the spray shielding panel rather than of the spindle head or the workpiece table). Moreover, this design saves space because the additional space behind the machine tool, in which the spindle head must move in machine tools according to the prior art, is no longer necessary. During machining of a workpiece, the spray shielding panel is completely "extended" so that the machining side and loading side are completely sealed off from one another. Since no cutouts etc. are required any longer, neither cutting fluid nor chips can therefore pass from the machining side to the loading side. The material outlay is also low, since shorter guide rails can be provided for the spindle head.

The overall operation of the new machine tool is such that during machining of a workpiece the spray shielding panel extends over its full length in the direction of the second coordinate, while during the relative positional change, whether by rotation of the workpiece table or by linear displacement between spindle head and workpiece table, it assumes its shortened position, by the fact that at least the variable-length/displaceable part is retracted. Since the spray shielding panel can be collapsed very much more quickly than the spindle head can be moved back, workpiece changing time is shortened by that time difference.

In an exemplary embodiment, it is preferred if the spray shielding panel is configured so as to telescope, at least in sections, in the direction of the second coordinate.

It is advantageous here that the change in length of the spray shielding panel is achieved in a mechanically simple manner. This feature is also advantageous in terms of space requirements, since the retracted spray shielding panel requires no more space than when it is extended.

It is furthermore preferred if the spray shielding panel comprises a first panel element joined to the workpiece table, as well as a second panel element that is displaceable with respect to the first panel element in the direction of the second coordinate.

This feature is particularly advantageous in design terms: to provide the ability to change the length of the spray shielding panel, all that is necessary is to provide a displaceable panel element or a corresponding section. Since this second panel element can be designed with low weight, an additional reduction in workpiece changing time results.

It is preferred in this connection if the first panel element is a double panel with a cavity in which the second panel element can be displaced.

The advantage of this feature is that the displacement mechanism itself is also protected from sprayed fluid. This yields greater operating reliability for the machine tool and also ensures a simple, space-saving design. In the retracted state, the second panel element displacing into the cavity requires no further space, so that the overall depth of the machine tool is also influenced positively. Since the second panel element is still partially enclosed on both sides by the double panel even in the extended state, the second panel element itself can be produced in a lightweight manner, for example from a transparent material such as Plexiglas, so that when this panel element is displaced only very small masses need to be moved. This again means that the time span between machining of two successive workpieces is kept very short.

It is further preferred if a piston-cylinder arrangement, which is joined to the second panel element and effects displacement of the second panel element, is provided.

This feature is again advantageous from a design point-of-view and in terms of the desired saving of time. Because the second panel element is displaced by the piston-cylinder arrangement only between its two end positions, a complex movement control system is not necessary. This ensures that the relative displacement movement between spindle head and workpiece table can be initiated immediately after machining of the first workpiece ends, while concurrently the piston-cylinder arrangement is actuated to pull the second panel element back. This movement of the second panel element occurs so quickly that no further waiting time needs to be provided for safety reasons. The entire workpiece changing time is therefore determined solely by the displacement velocity between spindle head and workpiece table.

It is preferred in this connection if the first panel element comprises a lower section that extends in the direction of the second coordinate substantially over the entire depth of the workpiece table in this direction, the first panel element having an L-shape.

The advantage of this feature is that the new spray shielding panel can also be used on existing machine tools. All that is necessary for this purpose is to remove the present spray shielding panel and mount the new spray shielding panel with the lower part of the "L" on the workpiece table. The second panel element seals the cutaway section of the "L" when the former is completely extended.

On the whole it is preferred here if, for purposes of the relative positional change, either the spindle or the workpiece table can be displaced along the first coordinate, or if the workpiece table can pivot in the direction of the first coordinate.

The features advantageously comprise all possibilities with which the relative positional change can be implemented.

It is understood that the features mentioned above and those yet to be explained below can be used not only in the respective combinations indicated, but also in other combinations and in isolation, without leaving the context of the present invention.

BRIEF DESCRIPTION OF THE DRAWINGS

The invention is depicted in the drawings and will be explained in more detail in the description below. In the drawings.

DETAILED DESCRIPTION OF THE PREFERRED EMBODIMENT

Figure 1:
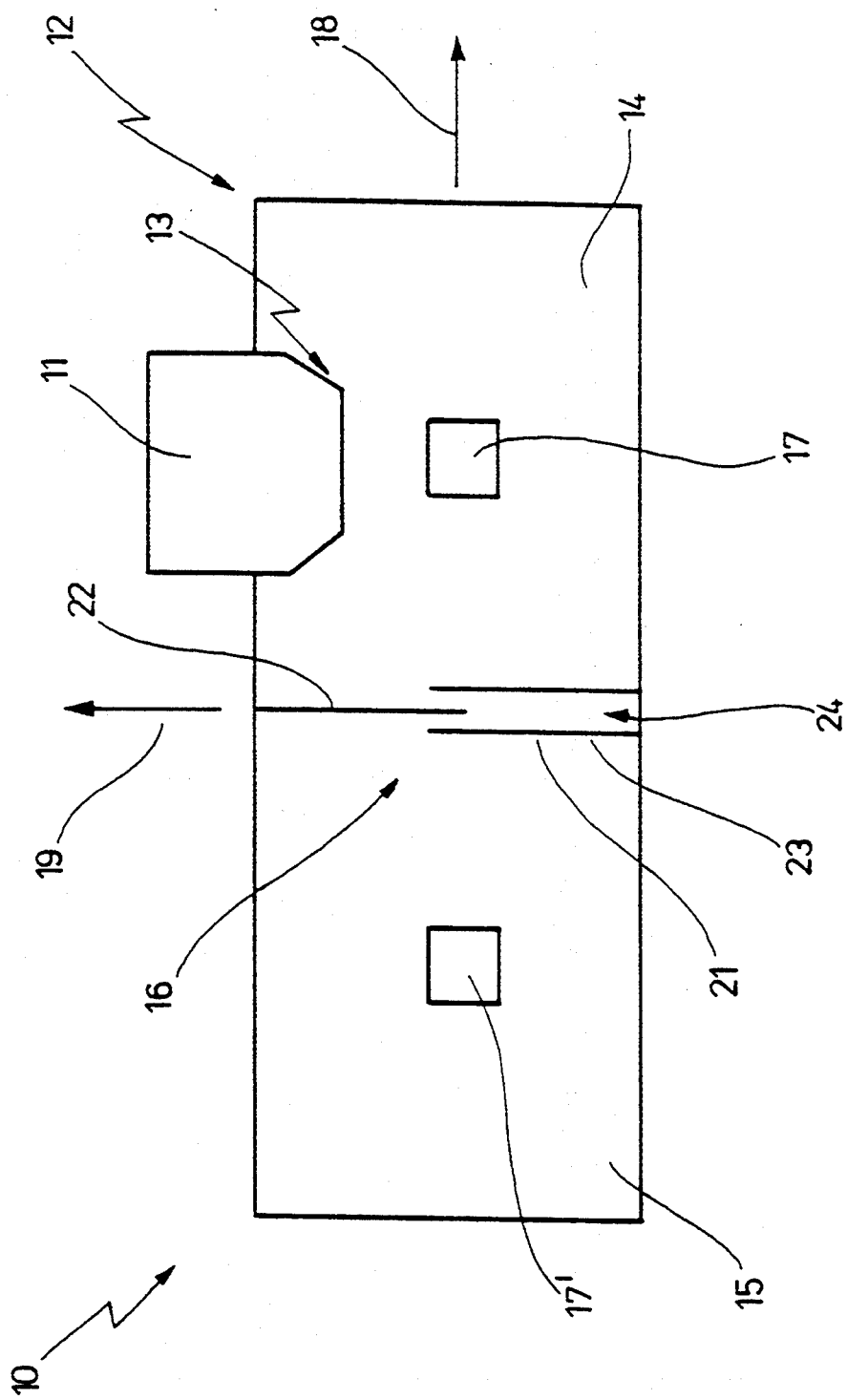
FIG. 1 shows a top view of a schematically depicted new machine tool with a new spray shielding panel extended, in a first exemplary embodiment.

FIG. 1 schematically shows a top view of a machine tool 10 according to a first exemplary embodiment of the invention. The machine tool 10 is a long-bed machine tool with a spindle head 11 and a workpiece table 12, such that a portion of the silhouette 13 of the spindle head 11 projects over the workpiece table 12.

In a known manner, the workpiece table 12 is divided into a machining side 14 and a loading side 15 (indicated on the left in FIG. 1) by a spray shielding panel 16 provided between these two regions. Indicated on the machining side 14 at 17 is a workpiece that has just been machined with a tool (not shown). During this machining of the workpiece 17, an operator can clamp a second workpiece 17' on the loading side 15, the operator being protected by the new spray shielding panel 16 from sprayed cutting fluid and flying chips on the machining side 14.

On the machine tool 10, the workpiece table 12 has a first coordinate 18 that corresponds to its lengthwise direction. The spray shielding panel 16 extends along a second coordinate 19 approximately perpendicular to the first coordinate 18. The machining side 14 and the loading side 15 can be interchanged by relative displacement between the spindle head 11 and the workpiece table 14, i.e. the spindle head 11 is then located on the left half of the workpiece table 12, while a third workpiece can be clamped on the right half.

Of course the machine tool 10 has a housing (not depicted) which encloses the respective machining side so that cutting fluid and chips cannot leave this region. As mentioned, this housing is not shown for illustrative reasons.

It is evident in the schematic depiction of FIG. 1 that the spray shielding panel 16 is configured so as to telescope in the direction of the second coordinate 19. For this purpose, the spray shielding panel 16 comprises a first panel element 21 that is joined immovably to the workpiece table 12. Also provided is a second panel element 22 that is displaceable with respect to the first panel element 21. For this purpose, the first panel element 21 is configured as a double panel 23 into whose cavity 24 the first panel element 22 partially projects.

FIG. 1 shows the spray shielding panel 16 in the position in which the second panel element 22 is moved far enough out of the double panel 23 for the spray shielding panel 16 to extend, in the direction of the second coordinate 19, over the entire depth of the workpiece table 12. This ensures that neither cutting fluid nor chips can pass from the machining side 14 to the loading side 15.

Figure 2:
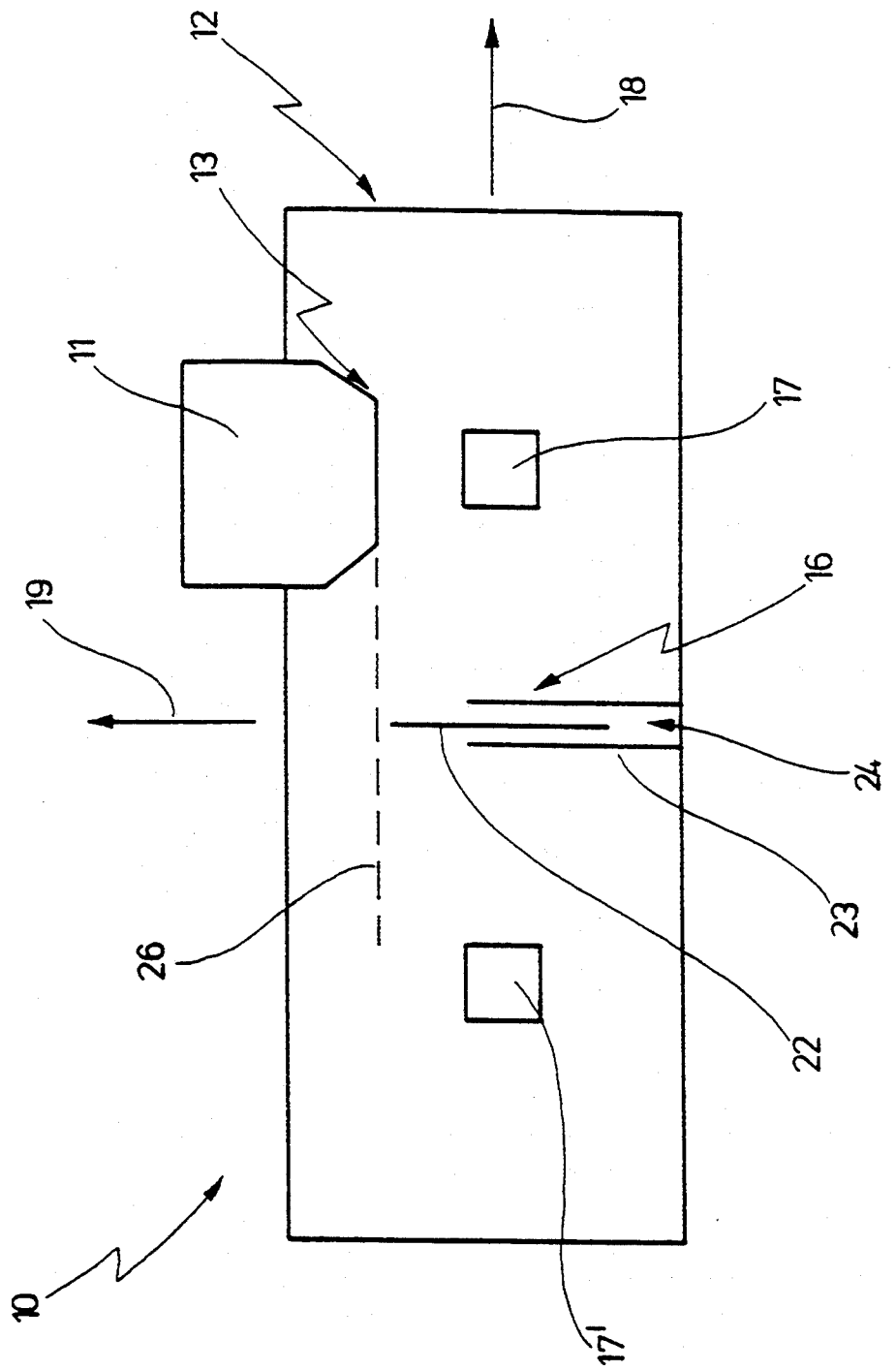
FIG. 2 shows a depiction like FIG. 1, but with the spray shielding panel retracted.

FIG. 2 depicts the machine tool 10 of FIG. 1 with the spray shielding panel 16 retracted. It is evident that the second panel element 22 has been moved far enough into the double panel 23 for the silhouette 13 of the spindle head 11 projecting over the workpiece table 12 to be able to move past the spray shielding panel 16 on its relative displacement travel (indicated at 26) without risk of collision. Immediately after machining of the workpiece 17 ends, the second panel element 22, which has a very low weight, is pulled into the double panel 23 so that the spindle head 11 can, without a major interruption, be immediately moved in the direction opposite to the first coordinate 18; or alternatively so that the workpiece table 12 can be moved in the direction of said coordinate 18. Since the mass of the second panel element 22 is much less than that of the spindle head 11 or the workpiece table 12, workpiece changing time is thus considerably reduced. Movement of, for example, the spindle head 11 around a fixed spray shielding panel covering the entire depth of the workpiece table 12 in the direction of the second coordinate 19 is also unnecessary, which again leads to a shorter tool changing time.

Figure 3:
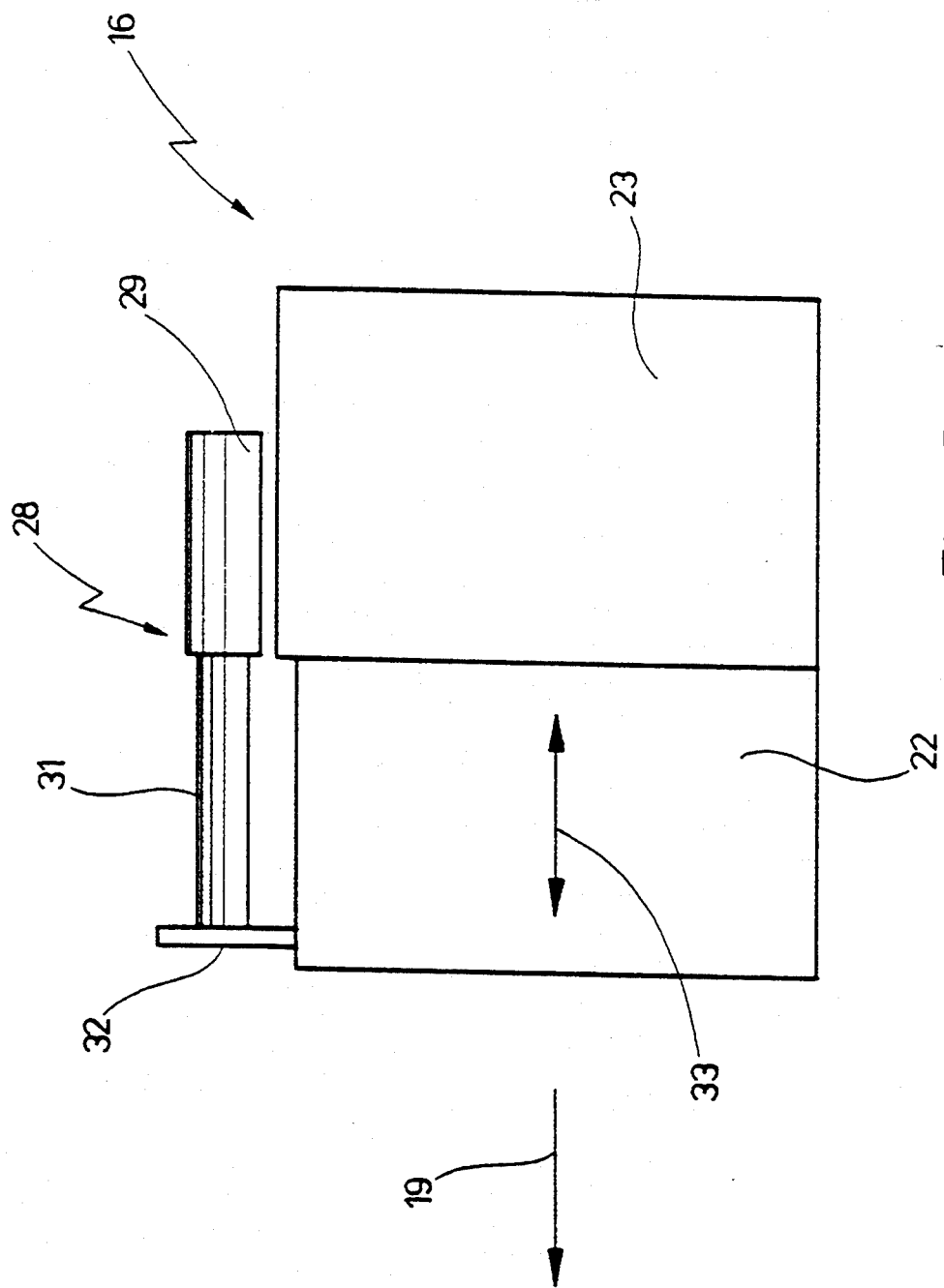
FIG. 3 shows a schematic side view of the new spray shielding panel according to FIG. 1.

FIG. 3 depicts the new spray shielding panel 12 in a schematic side view. A piston-cylinder arrangement 28, which is indicated above the spray shielding panel 16 and comprises a compressed-air cylinder 29 and a piston 31 that is fastened by means of a mount 32 to the second panel element, is provided in order to displace the second panel element 22 into the double panel 23. By simply retracting or extending the piston 31, the entire length of the spray shielding panel 16 in the direction of the second coordinate 19 can be changed. In the process, the second panel element 22 executes a travel indicated at 33. The piston-cylinder arrangement can be activated in such a way that the piston 31 and thus the second panel element 22 is moved back and forth only between two extreme positions; a further movement control system is not necessary.

In conclusion, it is also worth noting that accommodation of the second panel element 22 in the cavity 24 of the double panel 23 provides lateral stability for the second panel element 22, whose mechanical design can be correspondingly simple (i.e. it can be made of a transparent material such as Plexiglas). The weight of this second panel element 22 is thus so low that its mass can be ignored during acceleration. Of course the double panel 23 can also be made of a transparent material such as Plexiglas, so that the operator clamping a second workpiece 17' can therefore monitor the machining process on the machining side 14 through the consequently optically transparent spray shielding panel 16.

Figure 4:
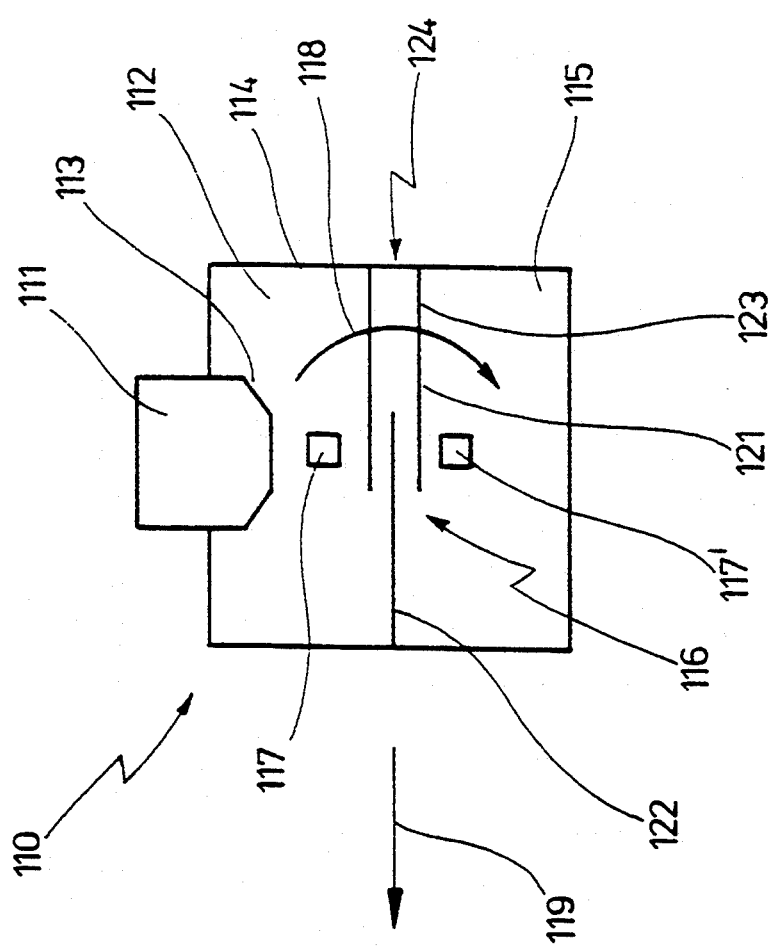
FIG. 4 shows a top view of a schematically depicted new machine tool in a second exemplary embodiment.

FIG. 4 depicts, in a second exemplary embodiment, a further machine tool 110 that comprises a spindle head 111 as well as a workpiece table 112 over which the silhouette 113 of the spindle head 111 extends. This workpiece table 112 is again divided into a machining side 114 and a loading side 115, a spray shielding panel 116 corresponding in configuration to the spray shielding panel 16 of FIG. 3 being provided between these regions. The spray shielding panel 116 also protects an operator clamping a second workpiece 117' during machining of a first workpiece 117.

In contrast to the machine tool 10 of FIGS. 1 and 2, the workpiece table 112 can be pivoted or rotated in the direction of a first coordinate 118 about a vertical axis, while the spray shielding panel 116 extends in the direction of a second coordinate 119 perpendicular to this angular coordinate 118. Also evident in FIG. 4 is the fact that the spray shielding panel 116 has a movable panel element 122 as well as a double panel 123, into whose cavity 124 the movable panel element 122 is displaced.

Figure 5:
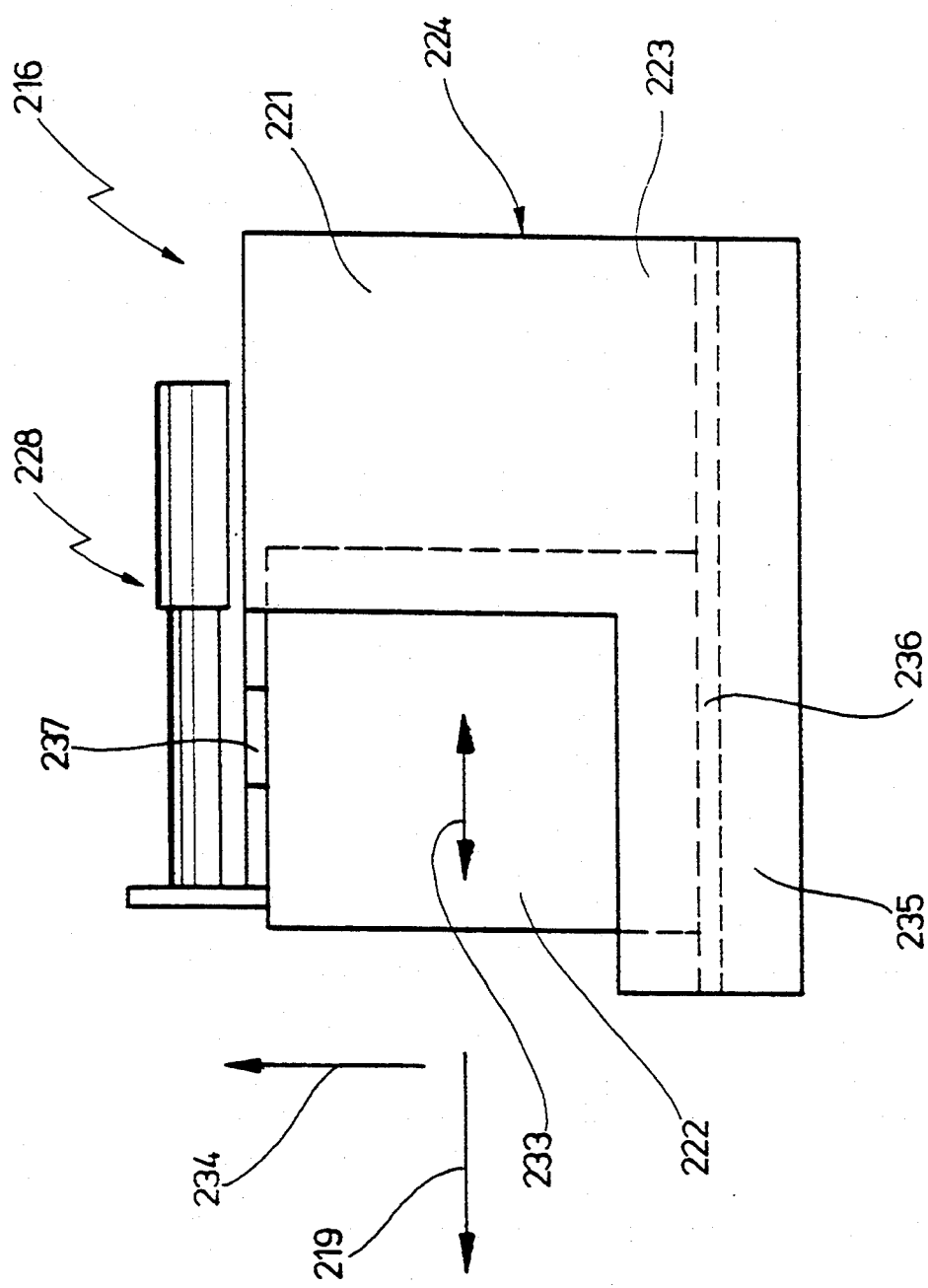
FIG. 5 shows, in a depiction like FIG. 3, a second exemplary embodiment of the new spray shielding panel.

FIG. 5 depicts, in a depiction like FIG. 3, the new spray shielding panel in a second exemplary embodiment. This spray shielding panel 216 also comprises a first panel element 221 as well as a second panel element 222, the first panel element 221 being a double panel 223 into whose cavity 224 the first panel element 222 is displaced in the direction of the second coordinate 219. A piston-cylinder arrangement 228, which provides the displacement travel indicated at 233 for the second panel element 222, is again provided.

In contrast to FIG. 3, however, the spray shielding panel 216 has in the direction of its height 234 a further immovable section 235 that extends, in FIG. 5 below the movable second panel element 22, over the entire depth of the workpiece table (not shown in FIG. 5) in the direction of the second coordinate 219. In other words the first panel element 221 is L-shaped, and its base extends over the entire workpiece table along its depth. The respective spindle head accordingly moves, when the second panel element 22 is retracted, above the part 235, in the space occupied by the movable second panel element 22 when the spray shielding panel 216 is closed.

FIG. 1 also indicates at 236 a guide rail in which the second panel element 222 moves. The spray shielding panel 216 can readily be exchanged for a conventional spray shielding panel with a cutaway, since the guide 236 and the piston-cylinder arrangement 228 are fastened to the spray shielding panel 216. As a result, existing machine tools can also be retrofitted with the new spray shielding panel 216 without having to make design changes to the machine tool itself. The new spray shielding panel 216 is equipped with the same mounting apparatus as existing spray shielding panels, so an exchange can be made without difficulty.

Also arranged in the region of the piston-cylinder arrangement 228 is a telescoping guide 237 that, together with the guide rail 236, ensures secure guidance of the second panel element 222 with respect to the L-shaped first panel element 221.

I claim:

1. A machine tool, comprising
   a spindle head means for receiving at least one tool element;
   a workpiece table means for clamping on its upper surface workpieces to be machined by said tool element, said upper surface being divided into a first region and a second region, one of said first and second regions being provided as a machining side for clamping first workpieces for machining by said tool element, and the other of said first and second regions being provided as a loading side for being loaded with second workpieces, preferably while said first workpieces are being machined;

means for exchanging the respective first and second regions with each other by means of a relative positional change between said spindle head means and said workpiece table means in the direction of a first coordinate of said workpiece table means; and a spray shielding panel means mounted on said upper surface of said workpiece table means between said first and second regions and extending in the direction of a second coordinate approximately perpendicular to said first coordinate;

said spray shielding panel means being configured at least in sections with a variable length in the direction of said second coordinate.

2. Machine tool according to claim 1, wherein the spray shielding panel means is configured so as to telescope, at least in sections, in the direction of said second coordinate.

3. Machine tool according to claim 1, wherein said spray shielding panel means comprises a first panel element secured to the workpiece table means, as well as a second panel element that is displaceable with respect to the first panel element in the direction of said second coordinate.

4. Machine tool according to claim 3, wherein the first panel element is a double panel element with a cavity means in which the second panel element can be displaced.

5. Machine tool according to claim 3, further comprising a piston-cylinder arrangement joined to the second panel element and operative for displacing the second panel element with respect to the first panel element.

6. Machine tool according to claim 5, wherein the first panel element comprises a lower section that extends in the direction of said second coordinate substantially over the entire depth of the workpiece table means in this direction such that said first panel element has an L-shape.

7. Machine tool according to claim 1, wherein the spindle head means is mounted such that it can be displaced along said first coordinate for purposes of said relative positional change.

8. Machine tool according to claim 1, wherein said workpiece table means is arranged such that it can be displaced along said first coordinate for purposes of said relative positional change.

9. Machine tool according to claim 1, wherein said workpiece table is mounted such that it can be pivoted in the direction of said first coordinate for purposes of said relative positional change.

10. Spray shield panel means for a machine tool comprising a spindle head means for receiving at least one tool element;

a workpiece table means for clamping on its upper surface workpieces to be machined by said tool element, said upper surface being divided into a first region and a second region, one of said first and second regions being provided as a machining side for clamping first workpieces for machining by said tool element, and the other of said first and second regions being provided as a loading side for being loaded with second workpieces, preferably while said first workpieces are being machined; and means for exchanging the respective first and second regions with each other by means of a relative positional change between said spindle head means and said workpiece table means in the direction of a first coordinate of said worpiece table means;

wherein said spray shielding panel means is mounted on said upper surface of said workpiece table means between said first and second regions and extends in the direction of a second coordinate approximately perpendicular to said first coordinate, said spray shielding panel means being configured at least in sections with a variable length in the direction of said second coordinate.

* * * * *